United States Patent
Ji et al.

(10) Patent No.: US 6,686,923 B2
(45) Date of Patent: Feb. 3, 2004

(54) MOTION ADAPTIVE DE-INTERLACING CIRCUIT AND METHOD

(75) Inventors: Jin Ji, Sunnyvale, CA (US); Henry Haojan Tung, San Jose, CA (US)

(73) Assignee: SmartASIC, Inc., San Jose, CA (US)

( * ) Notice: Subject to any disclaimer, the term of this patent is extended or adjusted under 35 U.S.C. 154(b) by 301 days.

(21) Appl. No.: 09/885,420

(22) Filed: Jun. 19, 2001

(65) Prior Publication Data

US 2003/0048278 A1 Mar. 13, 2003

(51) Int. Cl.$^7$ .................................................. H04N 7/01

(52) U.S. Cl. ........................ 345/606; 345/586; 348/441; 348/448

(58) Field of Search ................................ 345/418, 586, 345/588, 606, 609, 612, 615, 643, 692, 693, 694, 209; 348/445, 441, 446, 447, 448, 456, 451–452, 459, 469, 463, 490, 526, 538, 550

(56) References Cited

U.S. PATENT DOCUMENTS

| 4,783,698 A | * | 11/1988 | Harney ..................... 348/390.1 |
| 5,689,305 A | * | 11/1997 | Ng et al. .................. 375/240.15 |
| 5,886,745 A | * | 3/1999 | Muraji et al. ................ 348/448 |

* cited by examiner

*Primary Examiner*—Matthew C. Bella
*Assistant Examiner*—Wesner Sajous
(74) *Attorney, Agent, or Firm*—Bever, Hoffman & Harms, LLP; Edward S. Mao

(57) ABSTRACT

A method and circuit generates a complete picture from a series of digitized interlaced video fields. Each pixel in the complete picture is either duplicated from a digitized interlaced video field or interpolated from three adjoining digitized interlaced video fields. Interpolated pixels are computed from a combination of same-field and adjoining-field pixels. A percentage difference of the luminance values of the same-field and adjoining-field pixels included in the interpolation is used to maximize motion capture in the de-interlaced picture. Additional embodiments incorporate filtering of the percentage difference based on a threshold value to minimize soft noise in the de-interlaced picture.

26 Claims, 6 Drawing Sheets

MOTION ADAPTIVE DE-INTERLACING CIRCUIT AND METHOD

BACKGROUND OF THE INVENTION

1. Field of the Invention

The present invention relates to digital graphics systems. More specifically, the present invention relates to methods and circuits for de-interlacing digital pictures.

2. Discussion of Related Art

Analog video displays such as cathode ray tubes (CRTs) dominate the video display market. Thus, most electronic devices that require video displays, such as computers and digital video disk players, output analog video signals. As is well known in the art, an analog video display sequentially reproduces a large number of still images to give the illusion of full motion video.

Analog video signals for display on most consumer video systems are interlaced. Interlaced video signals contain data for every other line of a de-interlaced picture. Therefore, every other line is displayed each time the screen is refreshed. The portion of the interlaced video signal containing the odd scanlines (rows) of a picture is called the odd field and the portion of the interlaced video signal containing the even scanlines of a picture is called the even field.

For computer applications, a process called "progressive scan" is used to refresh the screen. In progressive scan, each line in a video signal is displayed in sequence, from the top of the screen to the bottom of the screen. As a result, each picture displayed in progressive scan is a full picture, rather than the half pictures displayed with interlaced video. For this reason, this type of picture display is also called "non-interlaced" video.

Color video signals contain luminance and chrominance information. Luminance is that portion of video corresponding to brightness value. Thus, luminance is the grayscale brightness value of a black-and-white picture. Chrominance is that portion of video that corresponds to color values and includes information about hue and saturation. Color video signals may be expressed in terms of a red component, a green component, and a blue component. Thus, luminance and chrominance information may be converted into a red, green and blue component. Luminance may be approximated by a weighted average of the red, green and blue components. In one well-known scheme, luminance is approximated by the equation: 0.30*red component+0.59*green component+0.11*blue component.

To create a digital display from an interlaced video signal, the interlaced video signal is digitized to define the pixels of a digital display. Because the video is interlaced, each field digitized will contain data for only half of the digital display. The half-picture data contained within the digitized fields of the interlaced video are usually processed into a full (de-interlaced) picture for digital display to improve picture quality. Current methods of de-interlacing video include BOB and weave de-interlacing.

FIG. 1 illustrates a portion of one field of a digitized video signal. FIG. 1 includes fields F(Z). Fifteen pixels of field F(Z) are shown. Pixels containing digitized data from the interlaced video signal are shown with solid outlines. Pixels requiring interpolated data are shown with dashed outlines. For clarity, pixels in field F(Z) are identified using a 3 dimensional coordinate system. As shown in FIG. 1, pixel P(X,Y,Z) is in the upper left corner of the portion of field F(Z). Pixel P(X+2,Y+1,Z) is in the center of the portion of field F(Z) shown in FIG. 1. Pixel P(X+4,Y+2,Z) is in the lower right corner of the portion of field F(Z) shown in FIG. 1.

BOB de-interlacing repeats the pixel data corresponding to each data-containing row. Thus, de-interlacing field F(Z) of FIG. 1 sets pixel P(X+C,Y+1,Z) equal to pixel P(X+C,Y,Z), where C is the column of the pixel, beginning with C=0. For example, for C=1, P(X+1,Y+1,Z) is set equal to pixel P(X+1,Y,Z). BOB de-interlacing induces a distortion into the de-interlaced picture. This distortion is especially apparent when pictures contain diagonal lines, where the BOB de-interlacing produces a stair-step effect rather than a smooth diagonal line.

FIG. 2 illustrates a portion of three adjoining fields of a digitized video signal. FIG. 2 includes successive fields F(Z−1), F(Z), and F(Z+1). One pixel in each of fields F(Z−1), F(Z), and F(Z+1) is shown. Pixels containing digitized data from the interlaced video signal are shown with solid outlines. The pixel requiring interpolated data is shown with a dashed outline. Field F(Z−1) precedes field F(Z) which precedes field F(Z+1). One row and column is shown for each of fields F(Z−1), F(Z), and F(Z+1). For clarity, the pixel in each field is identified using a 3 dimensional coordinate system. As shown in FIG. 2, pixel P(X,Y,Z+1) is in the center of the portion of field F(Z+1) shown in FIG. 2. Pixel P(X,Y,Z) is in the center of the portion of field F(Z) shown in FIG. 2. Pixel P(X,Y,Z−1) is in the center of the portion of field F(Z−1) shown in FIG. 2.

Weave de-interlacing uses the preceding field and the subsequent field to interpolate the unknown pixels in each field. Specifically, weave de-interlacing averages the pixel data in the preceding field with the pixel data in subsequent field. Thus, de-interlacing field F(Z) of FIG. 2 sets pixel P(X,Y,Z) equal to the average of pixel P(X,Y,Z+1) and pixel P(X,Y,Z−1). Weave de-interlacing induces a distortion into the de-interlaced picture. This distortion is an elongation effect apparent when the digitized interlaced video contains motion.

It would be desirable to de-interlace digitized interlaced video with minimal distortion.

SUMMARY

The present invention de-interlaces digitized fields (pictures) in a manner that accounts for the motion of objects in the fields. In accordance with an embodiment of the present invention, a de-interlaced picture is created from pixel data in three adjacent fields. The center field of the three adjacent fields is used as the basis for the de-interlaced picture. The pixels to be interpolated in the de-interlaced picture are calculated from a combination of percent differences of pixels located in rows adjoining each pixel to be interpolated in the center field (i.e., adjoining rows in the same field) and percent differences of pixels located in the rows of each pixel to be interpolated in the preceding and subsequent fields (i.e., adjoining columns in the adjacent fields). Luminance information effectively preserves the motion information in a video sequence. Thus, another embodiment of the present invention utilizes luminance information for the pixels used in the interpolation to account for motion.

In another embodiment of the present invention, an inverse weighted average of the minimum same-field percent difference and the minimum adjoining-field percent difference is used. Another embodiment of the present invention adds a threshold test preferring center pixels having a percent difference below the threshold to minimize soft noise in the calculation. Center pixels are pixels in the same column but adjoining rows of the same-field and pixels in the same row and same column in adjacent fields. When the center pixels have a percent difference above the threshold, this embodiment of the present invention picks one of the pixel pairs having a percent difference below the threshold. Pixel pairs are the opposing pixels used to calculate a percent difference. If all of the pixel pairs have percent differences above the threshold, then the pixel pair having the minimum percent difference is chosen.

The present invention will be more fully understood in view of the following description and drawings.

BRIEF DESCRIPTION OF THE DRAWINGS

Similar elements in Figures are labeled similarly.

DETAILED DESCRIPTION

In accordance with the present invention, a digital non-interlaced video signal is created from a digitized interlaced video signal. Each digitized field of the interlaced video signal is converted to a full digitized frame by generating the missing rows in the digitized field. Each digitized field is chosen in turn as the basis for a de-interlaced picture to generate these missing rows.

Figure 1:
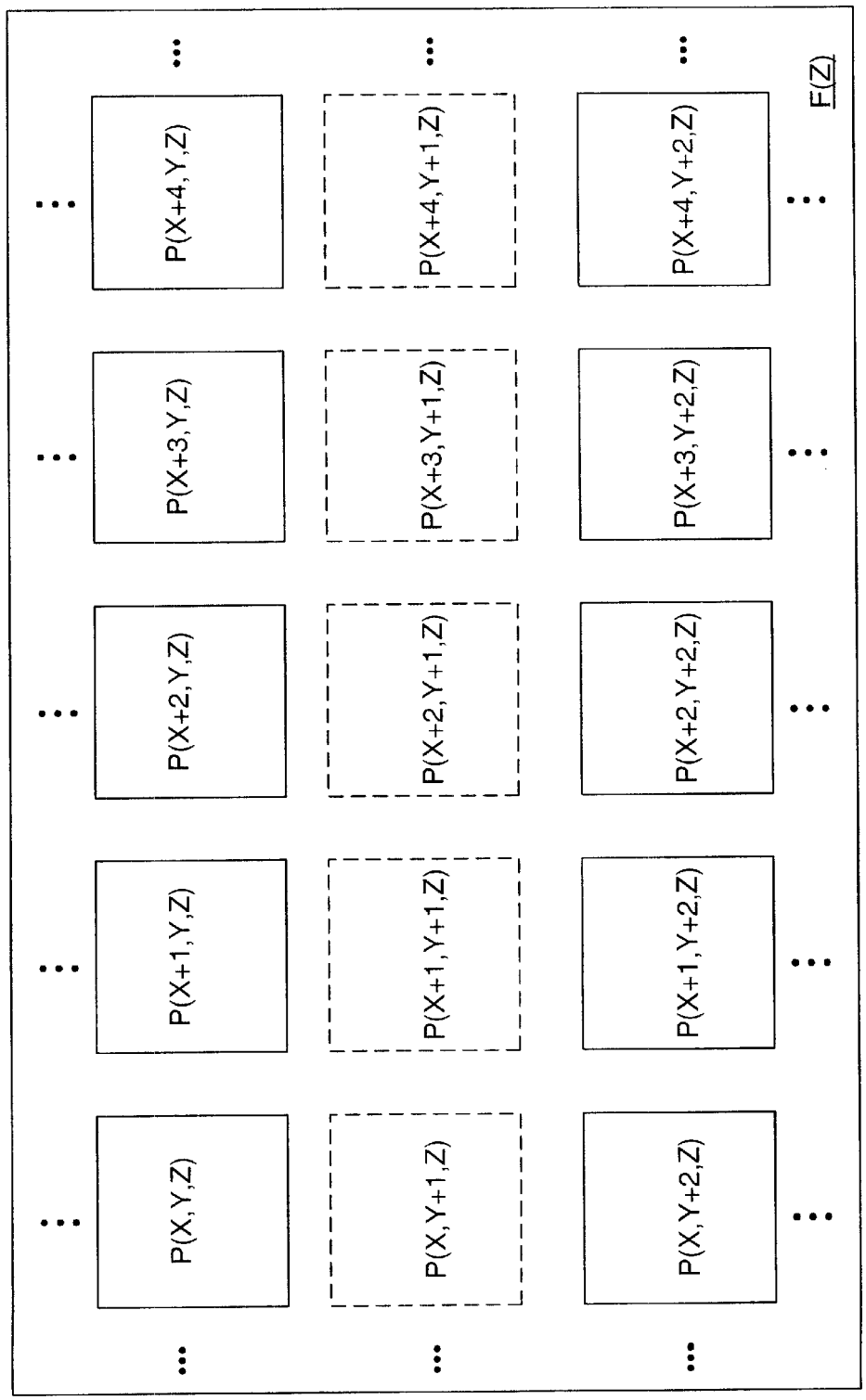
FIG. 1 illustrates a portion of a digitized picture in a field.
Figure 2:
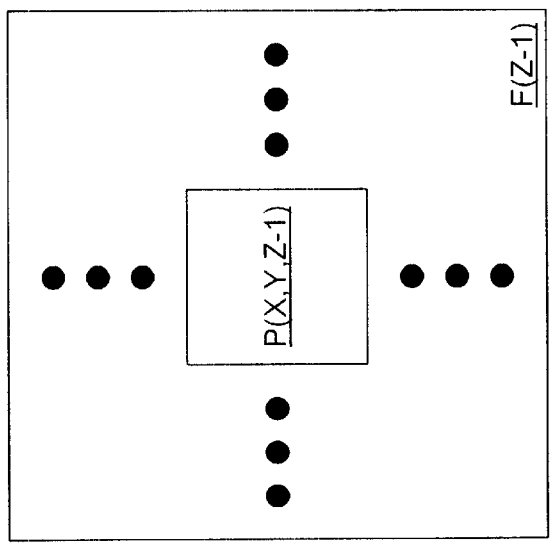
FIG. 2 illustrates a portion of three digitized pictures in adjacent fields.
Figure 2:
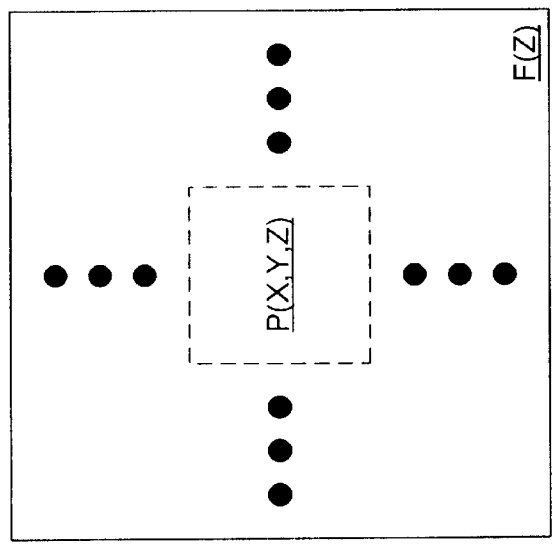
Figure 2:
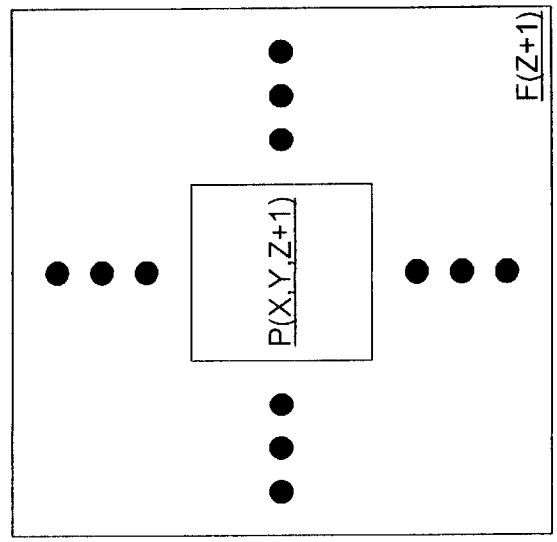
Figure 3:
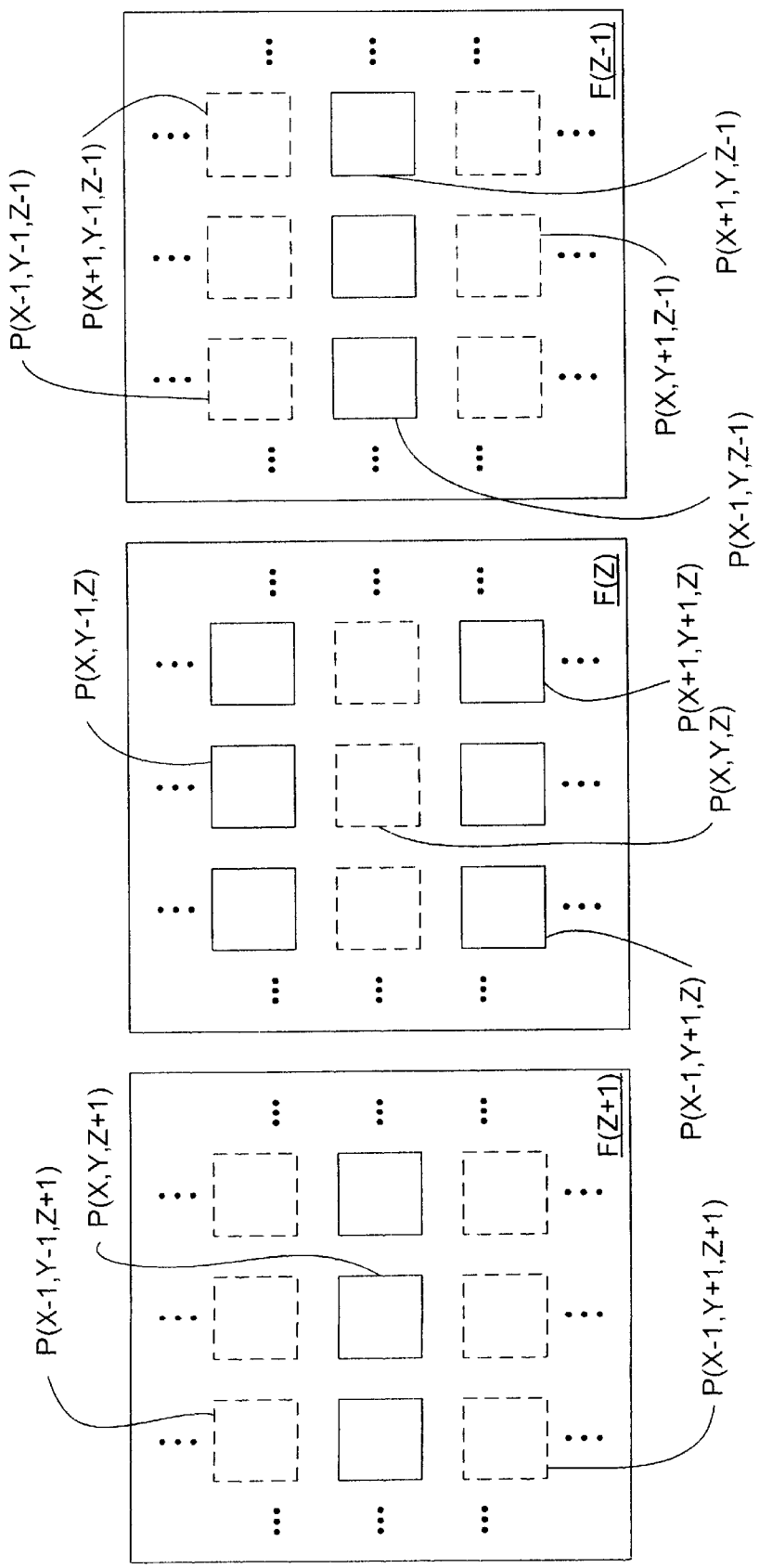
FIG. 3 illustrates a portion of three digitized pictures in adjacent fields.

FIG. 3 illustrates a portion of three adjacent fields of a digitized video signal. FIG. 3 includes successive fields F(Z−1), F(Z), and F(Z+1). Nine pixels in each of fields F(Z−1), F(Z), and F(Z+1) are shown. Pixels containing digitized data from the digitized interlaced video signal are shown with solid outlines. Pixels requiring interpolated data are shown with dashed outlines. Field F(Z−1) precedes field F(Z) in time which in turn precedes field F(Z+1) in time. Three adjoining rows and columns are shown for each of fields F(Z−1), F(Z), and F(Z+1). For clarity, pixels in each field are identified using a 3 dimensional coordinate system. As shown in Figure, pixel P(X,Y,Z+1) is in the center of the portion of field F(Z+1) shown in FIG. 3. Pixel P(X−1,Y−1, Z+1) is in one row up and one column back from P(X,Y, Z+1) of field F(Z+1). Pixel P(X,Y,Z) of field F(Z) and pixel P(X,Y,Z−1) of field F(Z−1) are in the same row and column as pixel P(X,Y,Z+1) of field F(Z+1).

In one embodiment of the present invention, field F(Z) of FIG. 3 is chosen as the basis for a first de-interlaced picture. Thus, pixel data is known for pixels P(X−1,Y−1,Z), P(X, Y−1,Z), P(X+1,Y−1,Z), P(X−1,Y+−1,Z), P(X,Y+1,Z), and P(X+1,Y+1,Z). Pixel data must be interpolated for pixels P(X−1,Y,Z), P(X,Y,Z), and P(X−1,Y,Z). In this embodiment, field F(Z+1) forms the basis of a second de-interlaced picture.

This embodiment of the present invention uses the luminance value of a pair of same-field pixels (one above and one below the pixel to be interpolated) and a pair of adjoining-field pixels (one preceding and one subsequent in time to the pixel to be interpolated) to interpolate the pixel. These four pixels are called calculation pixels, because these pixels are used in the interpolation of the unknown pixel value. The average red, green, and blue components of the average of these calculation pixels are combined in an inverse weighted average with their minimum percentage cross-differences to determine the red, green, and blue components of the pixel to be interpolated. This method will be clarified in application to the embodiment of the present invention described in the example below. Other embodiments may use both the luminance and chrominance information in the inverse weighted average calculation.

The calculation pixels are chosen from the pixels surrounding the pixel to be interpolated in both the same field and adjacent field. The pixels examined in any one direction (e.g. above the pixel to be interpolated) are called a pixel kernel. In other words, three pixels above the pixel to be interpolated (i.e. the pixels directly above, above and one column back, and above and one column forward) and three pixels below the pixel to be interpolated (i.e. the pixels directly below, below and one column back, and below and one column forward) as the pixel to be interpolated are examined in the same field when using a three pixel kernel. One pixel pair of those six calculation pixels is chosen for use in the same-field portion of the interpolation calculation. Similarly, three pixels in the same row as the pixel to be interpolated but one frame backward in time (i.e. the pixels in the same row but the frame backward in time that are in the same column, one column back, and one column forward) and three pixels in the same row as the pixel to be interpolated but one frame forward in time (i.e. the pixels in the same row but the frame forward in time that are in the same column, one column back, and one column forward) are examined using the three pixel kernel, and one pixel pair of those six examined pixels chosen as calculation pixels for use in the adjoining-field portion of the interpolation calculation.

Other embodiments may use other pixel kernel sizes (e.g. one, four, or seven pixels above, below, preceding, and subsequent to each pixel to be interpolated). For example, in another embodiment, a five pixel kernel is used, thereby investigating five pixels above and below the pixel to be interpolated for the same-field portion of the interpolation calculation and five pixels in the same row as the pixel to be interpolated but a preceding frame and subsequent frame for the adjoining-field portion of the interpolation calculation.

To aid in choosing the calculation pixels from the examined pixels, the pixels in a group around each calculation pixel are evaluated. For example, for a kernel of three having a group size of one, only the examined pixels are evaluated. However, for a pixel kernel of three and a group size of three, each examined pixel is evaluated using information from a group including the pixel to the left and right in the same row. Referring to FIG. 3, the pixel to the left of pixel P(X,Y−1,Z) is pixel P(X−1,Y−1,Z) and the pixel to the right of pixel P(X,Y−1,Z) is pixel P(X+1,Y−1,Z). While only pixel P(X,Y−1,Z) of that group is contending to be a calculation pixel, the determination of that contention includes information from pixels P(X−1,Y−1,Z) and P(X+1,Y−1,Z). Group size will be discussed in more detail below.

Opposing pixel pairs are used in a cross-difference in the present embodiment. Opposing pixel pairs, when used in a cross-difference, are two pixels diagonally across from each other. For example, pixel P(X−1,Y−1,Z) opposes pixel P(X+1,Y+1,Z) in a same-field cross direction. These opposing pixels are called left-right same-field opposing pixels due to their relation to pixel P(X,Y,Z), which is being interpolated in the present example. Similarly, pixel P(X+1,Y,Z+1) opposes pixel P(X−1,Y,Z−1) in an adjacent-field cross direction. These opposing pixels are called right-left adjoining-field opposing pixels due to their relation to pixel P(X,Y,Z).

The opposing pixel calculation may be extended to larger pixel kernels, such as a five investigated pixel embodiment with a group size of one using the left,left-right,right (i.e., the pixel one row up and two columns back from the pixel to be interpolated); left-right; center; right-left; and right, right-left,left (i.e., the pixel one row down and two columns forward from the pixel to be interpolated) opposing pixels for the same-field and adjoining-field calculations.

For the following example, assume a group size of one and that red, green, blue, and luminance information are assigned to the known pixels in FIG. 3 as shown in Table 1.

TABLE 1

| Pixel | red value | green value | blue value | luminance value |
|---|---|---|---|---|
| P (X − 1, Y, Z + 1) | 110 | 120 | 130 | 118.1 |
| P (X, Y, Z + 1) | 130 | 140 | 150 | 138.1 |
| P (X + 1, Y, Z + 1) | 150 | 160 | 170 | 158.1 |
| P (X − 1, Y − 1, Z) | 50 | 60 | 70 | 58.1 |
| P (X, Y − 1, Z) | 70 | 80 | 90 | 78.1 |
| P (X + 1, Y − 1, Z) | 95 | 105 | 115 | 103.1 |
| P (X − 1, Y + 1, Z) | 90 | 100 | 110 | 98.1 |
| P (X, Y + 1, Z) | 110 | 120 | 130 | 118.1 |
| P (X + 1, Y + 1, Z) | 130 | 140 | 150 | 138.1 |
| P (X − 1, Y, Z − 1) | 255 | 255 | 255 | 255 |
| P (X, Y, Z − 1) | 255 | 255 | 255 | 255 |
| P (X + 1, Y, Z − 1) | 90 | 100 | 110 | 98.1 |

In this embodiment, the calculation pixels are chosen by using the opposing kernel pixels having a group with a minimum average cross-difference. Thus, the average cross-difference of opposing pixel group sums in the same field is computed and the minimum average cross-difference chosen. Because the opposing pixels are in the same field, this average cross-difference identifies variations within a picture. This cross-difference is unsigned. Thus, the absolute value of the difference used. Next, the average cross-difference of the opposing calculation pixel group sums in the adjoining-fields is computed and the minimum average cross-difference chosen. Because the adjacent fields represent a picture at different times, this average cross-difference identifies variations over time (i.e., motion). An inverse weighted average of the minimum cross-differences of the same field and the adjacent fields is computed, thereby determining the value of the interpolated pixel. Each unknown pixel is computed this way.

For example, to interpolate pixel P(X,Y,Z), first the same-field average cross-difference is computed (ACD_SF). The left-right average same-field cross-difference with a group size of one is computed by dividing the difference of the upper left and lower right opposing pixels by the average of the upper left and lower right opposing pixels. Thus, the difference of the luminance value of pixel P(X−1,Y−1,Z) and the luminance value of pixel P(X+1,Y+1,Z) is divided by the average luminance value of pixels P(X−1,Y−1,Z) and P(X+1,Y+1,Z). This calculation is shown in the following equation.

$$\text{ACD\_SF}(i) = \frac{|P(X - i, Y - 1, Z) - P(X + i, Y + 1, Z)|}{\left(\frac{1}{2}\right)(P(X - i, Y - 1, Z) + P(X + i, Y + 1, Z))}$$

where i=−N, . . . , −1, 0, 1, . . . , N. N is an integer equal to half of the number of pixels in the pixel kernel.

The left-right difference for (ACD_SF(−1)) is the luminance difference (138.1−58.1=80) divided by the luminance average ((138.1+58.1)/2=98.1). The resultant value (ACD_SF(−1)) is an (80/98.1=0.8155) 81.55% difference in luminance between the upper left pixel and the lower right pixel in field F(Z). Similarly, the center average same-field cross-difference (ACD_SF(0)) is the difference (118.1−78.1=40) of the luminance of the upper pixel P(X,Y−1,Z) and the lower pixel P(X,Y+1,Z) divided by the average ((118.1+78.1)/2=98.1). The resultant center same-field average cross-difference is 40.77%. The right-left average same-field cross-difference is also the difference (103.1−98.1=5) of the luminance of adjoining upper right pixel P(X+1,Y−1,Z) and lower left pixel P(X−1,Y+1,Z) divided by the average ((103.1+98.1)/2=100.6). The resultant right-left average same-field cross-difference (ACD_SF(1)) is 4.97%.

After computing the same-field average cross-difference, the minimum of the resulting percentages is chosen (Min_ACD_SF). The minimum average cross-difference of the same-field average cross-differences computed above is the minimum of 81.55%, 40.77%, and 4.97%, which results in a 4.97% minimum average cross-difference for the same-field. This calculation is shown in the following equation, where N is an integer equal to one half of one less than the number of pixels in the cross-difference.

$$\text{Min\_ACD\_SF} = \min(\text{ACD\_SF}(i))$$

for i=−N to N. Thus $$\text{Min\_ACD\_SF} = \min(\text{ACD\_SF}(-N), \text{ACD\_SF}(N+1), \ldots, \text{ACD\_SF}(N))$$

For a pixel kernel of three, N=int(½3), or 1. Thus, i=−1, 0, and 1.

After determining the same-field minimum average cross-difference, the adjoining-fields average cross-difference is computed (ACD_AF). The left-right adjoining-field average cross-difference with a group size of one is computed by dividing the difference of the luminance values of the left pixel P(X−1,Y,Z+1) in field F(Z+1) and the right pixel P(X+1,Y,Z−1) in field F(Z−1) by the average of the luminance values of pixels P(X−1,Y,Z+1) and P(X+1,Y,Z−1). This calculation is shown in the following equation.

$$\text{ACD\_AF}(i) = \frac{|P(X - i, Y, Z + 1) - P(X + i, Y, Z - 1)|}{\left(\frac{1}{2}\right)(P(X - i, Y, Z + 1) + P(X + i, Y, Z - 1))}$$

for i=−N, . . . , 0, . . . , N. Again, with a pixel kernel of three, N=1.

The left-right adjoining-field difference (ACD_AF(−1)) is the luminance difference (118.1−98.1=20) divided by the luminance average ((118.1+98.1)/2=108.1). The resultant value is an (20/108.1=0.1850) 18.50% difference in luminance between the left pixel in field F(Z+1) and the right pixel in field F(Z−1). Similarly, the center adjoining-field average cross-difference (ACD_AF(0)) is the difference (255−138.1=116.9) of the luminance of pixel P(X,Y,Z+1) in field F(Z+1) and pixel P(X,Y,Z−1) in field F(Z−1) divided by the average of pixels P(X,Y,Z+1) and P(X,Y,Z−1). The resultant center adjoining-field average cross-difference is 59.48%. The right-left adjoining-field average cross-difference (ACD_AF(1)) is also the difference (255−158.1=96.9) of the luminance of pixel P(X+1,Y,Z+1) of field F(Z+1) and pixel P(X−1,Y,Z−1) of field F(Z−1) divided by the average ((98.1+98.1)/2=98.1). The resultant right-left adjoining-field average cross-difference is 46.91%.

After computing the adjoining-field average cross-difference, the minimum of the resulting percentages is chosen (Min_ACD_AF). The minimum adjoining-field average cross-difference of these is the minimum of 18.50%, 59.48%, and 46.91%, which results in an 18.50% minimum average cross-difference for the adjoining-fields. This calculation is shown in the following equation.

$$Min\_ACD\_AF = \min(ACD\_AF(i))$$

for i=-N to N. Thus $$Min\_ACD\_AF = \min(ACD\_AF(-N), ACD\_AF(N+1), \ldots, ACD\_AF(N))$$

where N=1 for the pixel kernel of three.

Once the minimum average cross-difference is computed for the same-field (Min_ACD_SF) and the adjoining-fields (Min_ACD_AF), the average of the color values (ACV_SF and ACV_AF) of the calculation pixels (i.e. the pixels creating the minimum average cross-difference is computed). In this example, the red, green, and blue color component values as shown in Table 1 are used in the interpolation.

For the same-field, the minimum average cross difference (ACV_SF) was obtained from the right-left examined pixels P(X+1,Y-1,Z) and P(X-1,Y+1,Z). Thus, pixels P(X+1,Y-1,Z) and P(X-1,Y+1,Z) are chosen from the calculation pixels. The color component averages of the same-field minimum average cross-difference (R(Min_ACV_SF), G(Min_ACV_SF), B(Min_ACV_SF)) are ((95+90)2=92.5) for red, ((105+100)/2=102.5) for green, and ((115+110)/2=112.5) for blue. For the adjacent fields, the minimum average cross-difference (ACV_AF) was obtained from the left-right examined pixels P(X-1,Y,Z+1) and P(X+1,Y,Z-1). Thus, the color component averages of the adjoining-field minimum average cross-difference (R(Min_ACV_AF), G(Min_ACV_AF), B(Min_ACV_AF)) are ((110+90)/2=100) for red, ((120+100)/2=110) for green, and ((130-110)/2=120) for blue.

Other embodiments use other methods for determining the calculation pixels, as described in more detail below.

Next, the inverse weighted average, based on the minimum average cross-differences, is applied to the color component averages of the same and adjoining-fields to obtain the color value of the pixel to be interpolated. In some embodiments, the same-field minimum average cross-difference weighted by the inverse of the sum of the same and adjoining-field average cross differences is multiplied by the adjoining-field color component averages, which is summed with the adjoining-field minimum average cross-difference weighted by the inverse of the sum of the same and adjoining-field average cross differences multiplied by the same-field color component averages to achieve the interpolated value of the pixel. This inverse weighted average (IWA) calculation is shown in the following equation for each color component.

For the red component:

$$R(IWA) = \left(\frac{Min\_ACV\_SF}{Min\_ACV\_SF + Min\_ACV\_AF}\right)(R(Min\_ACV\_AF)) + \left(\frac{Min\_ACV\_AF}{Min\_ACV\_SF + Min\_ACV\_AF}\right)(R(Min\_ACV\_SF))$$

For the green component:

$$G(IWA) = \left(\frac{Min\_ACV\_SF}{Min\_ACV\_SF + Min\_ACV\_AF}\right)(G(Min\_ACV\_AF)) + \left(\frac{Min\_ACV\_AF}{Min\_ACV\_SF + Min\_ACV\_AF}\right)(G(Min\_ACV\_SF))$$

For the blue component:

$$B(IWA) = \left(\frac{Min\_ACV\_SF}{Min\_ACV\_SF + Min\_ACV\_AF}\right)(B(Min\_ACV\_AF)) + \left(\frac{Min\_ACV\_AF}{Min\_ACV\_SF + Min\_ACV\_AF}\right)(B(Min\_ACV\_SF))$$

Thus, the same-field minimum average percent cross-difference (4.97%) weighted by the inverse of the sum of the same and adjoining-field average percent cross-differences (4.97%+18.50%=23.47%) is multiplied by the adjoining-field color component averages ((4.97/23.47)*(100 red, 110 green, 120 blue) which is summed with the adjoining-field minimum average cross-difference (18.50%) weighted by the inverse of the sum of the same and adjoining-field average cross differences 4.97%+18.50%=23.47%) multiplied by the same-field color component averages ((18.50/23.47)*(92.5 red, 102.5 green, 112.5 blue) to achieve the interpolated value of the pixel. Therefore, the interpolated value of the pixel is equivalent to (0.21*100+0.79*92.5=94) red, (0.21*110+0.79*102.5=104) green, and (0.21*120+0.79*112.5=114) blue. Thus, the color values for the interpolated pixel are 94 red, 104 green, and 114 blue.

Because luminance may be calculated from the red, green, and blue component values of a pixel, another embodiment of the present invention may use red, green, and blue component values directly, rather than including the intermediate step of calculating the luminance value. Still another embodiment uses luminance and chrominance directly in the inverse weighted average, without breaking out the red, green, and blue component values. Luminance may also be provided directly. Additionally, typically four fields are buffered for the de-interlacing method.

In another embodiment, an average cross-difference threshold is used to filter the average cross-differences to minimize the effects of soft noise. Soft noise is noise inducing small variations in red, green, and blue components. The threshold is user defined, typically ¼ (25%), ⅛ (12.5%), or ¹⁄₁₆ (6.25%). When all average cross-differences are above the threshold, the minimum average cross-difference for each (same and adjoining) field is used in the interpolation as described with respect to the first embodiment. If the same-field center pixels produce an average cross-difference below the threshold, then the center pixels are preferred for the inverse weighted average. If the same-field center pixels produce an average cross-difference that is not below the threshold, but other average cross-differences are below the threshold, the pixels (and associated average cross-differences) below the threshold are randomly chosen for the inverse weighted average. Adjoining-field pixels are compared to the threshold in the same manner as same-field pixels. In this way, soft noise is minimized.

In the example above, if the threshold is set at 50%, then the minimum average cross-difference of the same-field average cross-differences used in the calculation would be 40.77% from the preferred same-field center pixels P(X,Y-1,Z) and P(X,Y+1,Z), rather than the true minimum average cross-difference of 4.97% from left-right pixels P(X-1,Y-

1,Z) and P(X+1,Y+1,Z), because of the threshold preference for the center pixels. However, two non-center pixels (left-right and right-left pixels) in the adjoining-field have average cross-differences below the threshold. Thus, because one of the left-right and right-left adjoining-field average cross-differences is below the threshold, one cross-difference is chosen randomly.

Boundary conditions may be handled a variety of ways. Most commonly, boundary pixels are repeated to provide additional boundary information. Occasionally, boundary pixels are assumed to be black (e.g., 0 red, green, and blue components with 0 luminance) to provide the additional required information.

Other embodiments may use other group sizes in calculating cross-difference sums. For example, a group size of three with an pixel kernel of three uses a three pixel group for each of the left-right, center-center, and right-left average cross-differences for both the same-field and adjoining-fields. Specifically, for the left-right average cross-difference investigation, the cross-difference is calculated by centering the three pixel group on the left-right pixels, resulting in a three-group cross difference calculated by summing the absolute values of the left,left-center, the left-right, and the center-right,right cross differences. To extend the pixel group size, additional pixels are added to the left and right of each calculation pixel when determining cross-differences. The case of three investigated pixels with a group size of three is illustrated more clearly in the example below.

Figure 4:
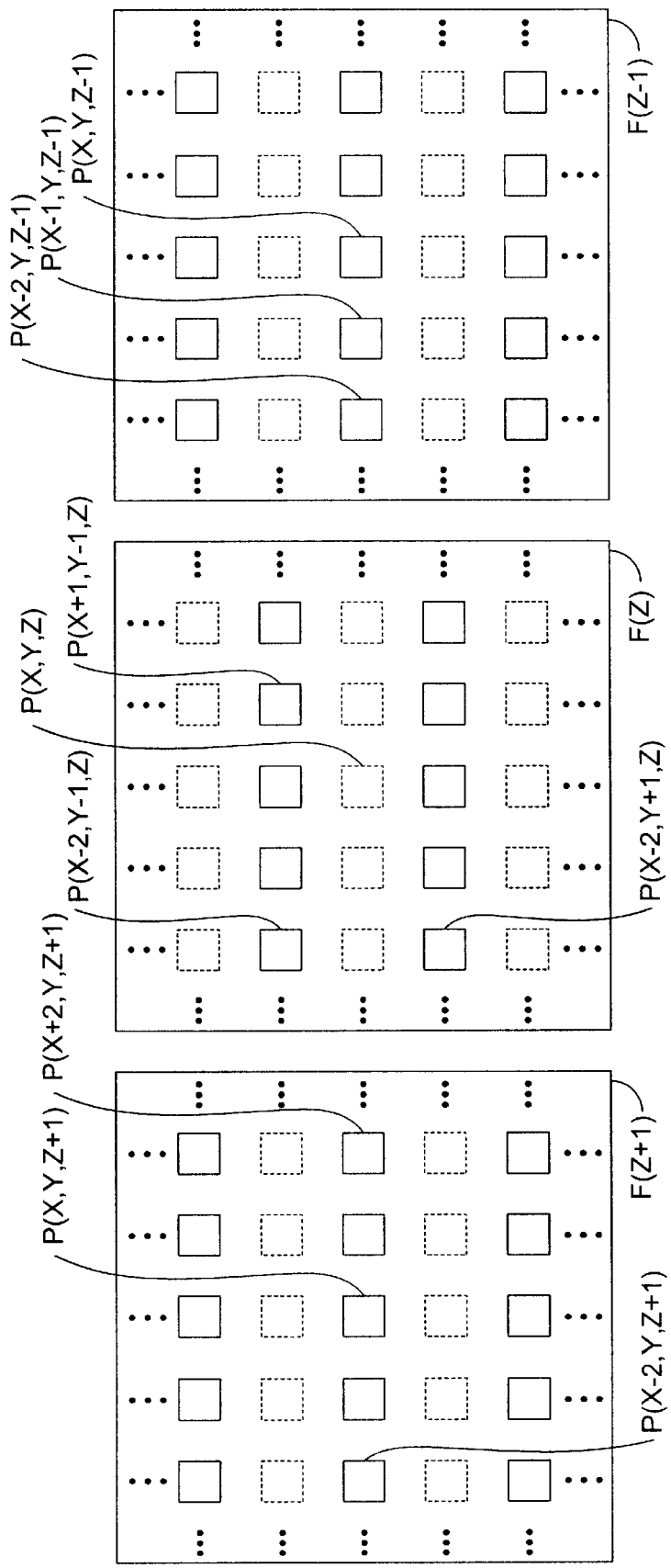
FIG. 4 illustrates another greater portion of the three digitized pictures in adjacent fields of FIG. 3.

FIG. 4 illustrates a larger portion of the three adjacent fields of a digitized video signal shown in FIG. 3. Thus, FIG. 4 includes successive fields F(Z−1), F(Z), and F(Z+1). Pixels containing digitized data from the digitized interlaced video signal are shown with solid outlines. Pixels requiring interpolated data are shown with dashed outlines. Field F(Z−1) precedes field F(Z) which precedes field F(Z+1). Five adjoining rows and columns are shown for each of fields F(Z−1), F(Z), and F(Z+1). The pixels utilized in a three pixel group size calculation for three examined pixels are located in rows Y−1, Y, and Y+1 of field F(Z), pixel. Thus, pixel P(X,Y,Z) is the pixel to be interpolated in the displayed portion of field F(Z), pixels P(X−2,Y−1,Z) through P(X+2,Y−1,Z) and P(X−2,Y+1,Z) through P(X+2,Y+1,Z) have known values and adjoin the row containing pixel P(X,Y,Z) in field F(Z), pixels P(X−2,Y,Z+1) through P(X+2,Y,Z+1) have known values and are in the same row as pixel P(X,Y,Z) in adjacent-field F(Z+1), and pixels P(X−2,Y,Z−1) through P(X+2,Y,Z−1) have known values and are in the same row as pixel P(X,Y,Z) in adjacent-field F(Z−1).

As described above with respect to FIG. 3, a three pixel kernel is used in the present calculation. Thus, the same-field calculation is based around the six same-field calculation pixels, that is the left-right (P(X−1,Y−1,Z)−P(X+1,Y+1,Z)), center-center (P(X,Y−1,Z)−P(X,Y+1,Z)), and right-left (P(X+1,Y−1,Z)−P(X−1,Y+1,Z)) cross-differences. However, in this embodiment the group size is three. Thus, additional pixels to the left and right of these calculation pixels are used in the minimizing cross-difference calculation. Specifically, the same-field group average cross-difference sums are calculated as follows:

$$\text{SUM\_SF}(i) = \frac{\sum_{-M}^{M} |P(X+i-M, Y-1, Z) - P(X-i+M, Y+1, Z)|}{\sum_{-M}^{M} \frac{1}{2}(P(X+i-M, Y-1, Z) + P(X-i+M, Y+1, Z))}$$

where M is equal to the integer of half the group size and j is summed across −M to M. Thus, for a group size of three, M=int(½3), or 1. Note that for a group size of one (i.e., j=0), SUM_SF(i)=ACD_SF(i) (described above with respect to FIG. 3). The center pixel difference in each same-field group cross-difference sum (i.e. the pixel difference for j=0) is similar to the field pixel difference in the group size one example of FIG. 3.

The center pixel difference of the minimum sum is used as the same-field cross-difference. The minimum sum is calculated as follows:

$$Min\_Sum\_ACD\_SF = \min(SUM\_SF(i)) \text{ for } i=-N \text{ to } N$$

Thus, for a pixel kernel of three, $$Min\_Sum\_ACD\_SF = \min(SUM\_SF(-1), SUM\_SF(0), SUM\_SF(1))$$

Min_ACD_SF is calculated using the average cross-difference of the j=0 pixel for the Min_Sum_ACD_SF group. In other words, if Min_Sum_ACD_SF equals SUM_SF(−1), then Min_ACD_SF is calculated using the average left-right pixel cross-difference, which is the average cross-difference between pixels P(X−1,Y−1,Z) and P(X+1,Y+1,Z). If Min_Sum_ACD_SF equals SUM_SF(0), then Min_ACD_SF is calculated using the average center-center pixel difference between P(X,Y−1,Z) and P(X,Y+1,Z). If Min_Sum_ACD_SF equals SUM_SF(1), then Min_ACD_SF is calculated using the average right-left pixel difference between P(X+1,Y−1,Z) and P(X−1,Y+1,Z). For example, if Min_Sum_ACD_SF equals SUM_SF(R) (i.e. i=R), then Min_ACD_SF is calculated as follows:

$$Min\_ACD\_SF = \frac{|P(X+R, Y-1, Z) - P(X-R, Y+1, Z)|}{\frac{1}{2}(P(X+R, Y-1, Z) - P(X-R, Y+1, Z))}$$

As a result, in this embodiment, the minimum same-field average cross-difference is determined from the center pixels of the group having the minimum average sum cross-difference.

Other embodiments calculate the minimum average cross-difference in other ways. For example, in one embodiment, the sum of the percent cross-differences of each pixel difference in a group are compared to find the minimum sum. In another embodiment, the sum of the cross-differences of each pixel in the sum are added together and compared to the sum of the other groups for the minimum sum calculation. Specifically, in this other embodiment, the minimum average cross difference would be calculated from the center pixels of the minimum of the sum of each pixel group. Thus, in this other embodiment, $$\text{Min\_Sum\_ACD\_SF} = \min \sum_{-M}^{M} |P(X+i+j, Y-1, Z) - P(X-i+j, Y+1, Z)|$$

for j=−M to M across all i.

Returning to the example of FIG. 4, the adjacent-field calculation is similarly based around the calculation pixels of the adjacent-field, that is left-right P(X−1,Y,Z+1)−P(X−1,Y,Z−1), center-center P(X,Y,Z+1)−P(X,Y,Z−1), and right-left P(X+1,Y,Z+1)−P(X+1,Y,Z−1) cross-differences. Again, because the group size is three, additional pixels to the left and right of these calculation pixels are used in the minimum cross-difference calculation. Specifically, the adjacent-field group average cross-difference sums are calculated as follows:

$$\text{SUM\_AF}(i) = \frac{\sum_{-M}^{M} |P(X+i+j, Y, Z+1) - P(X-i+j, Y, Z-1)|}{\sum_{-M}^{M} \frac{1}{2}(P(X+i+j, Y, Z+1) - P(X-i+j, Y, Z-1))}$$

where j is equal to the integer of half the group size. Again, for a group size of three, M=int(½3), or 1. Note that for a group size of one (i.e., j=0), SUM__AF(i)=ACD__AF(i). The center pixel difference in each adjacent-field group cross-difference sum (i.e. the pixel difference for j=0) is similar to the field pixel difference in the group size one example of FIG. 3.

The center pixel difference of the minimum sum is used as the adjacent-field cross-difference. The minimum sum is calculated as follows:

Min__Sum__ACD__AF=min(SUM__AF(i)))

Thus, for a pixel kernel of three,

Min__Sum__ACD__AF=min(SUM__AF(−1),SUM__AF(0),SUM__AF(1))

Min__ACD__AF is calculated using the average cross-difference of the j=0 pixel for the Min__Sum__ACD__AF group. In other words, if Min__Sum__ACD__AF equals SUM__SF(−1), then Min__ACD__SF is calculated using the average left-right pixel cross-difference, which is the average cross-difference between pixels P(X−1,Y,Z+1) and P(X+1,Y,Z−1). If Min__Sum__ACD__AF equals SUM__AF(0), then Min__ACD__AF is calculated using the average center-center pixel cross-difference, which is the average cross-difference between pixels P(X,Y,Z+1) and P(X,Y,Z−1). If Min__Sum__ACD__AF equals SUM__AF(1), then Min__ACD__AF is calculated using the average right-left pixel cross-difference, which is the average cross-difference between pixels P(X+1,Y,Z+1) and P(X+1,Y,Z−1). For example, if Min__Sum__ACD__AF equals SUM__AF(R) (i.e. i=R), then Min__ACD__AF is calculated as follows:

$$\text{Min\_ACD\_AF} = \frac{|P(X+R, Y, Z+1) - P(X-R, Y, Z-1)|}{\frac{1}{2}(P(X+R, Y, Z+1) - P(X-R, Y, Z-1))}$$

As a result, in this embodiment, the minimum adjacent-field average cross-difference is determined from the center pixels of the group having the minimum average sum cross-difference.

Similar to the example of FIG. 3, the average red, green, and blue components of the average of the pixels having the minimum cross-differences are combined in an inverse weighted average with the minimum cross-differences to determine the red, green, and blue components of the pixel to be interpolated. The group size may be extended to include additional pixels to the left and right of each investigated pixel.

Figure 5:
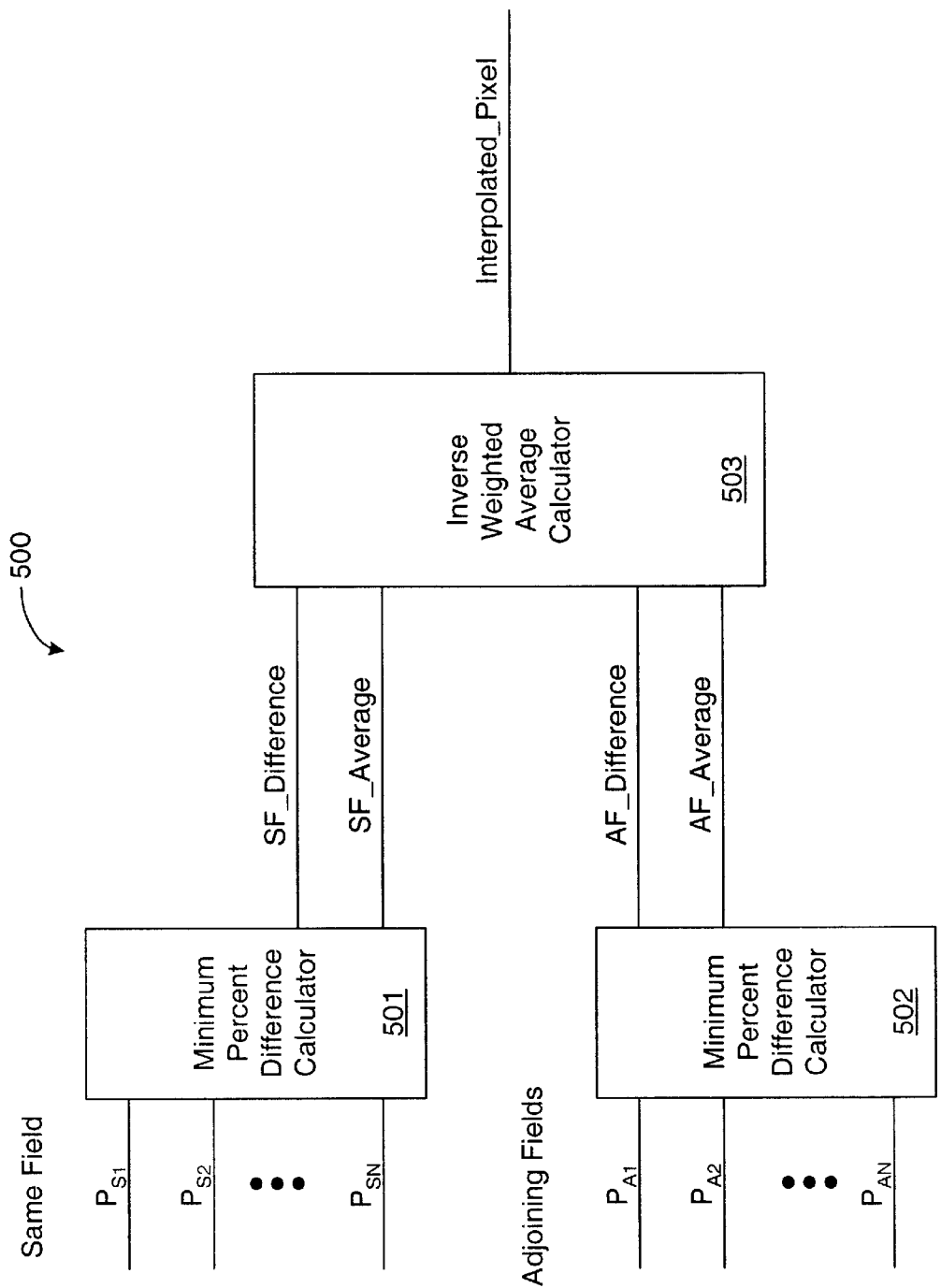
FIG. 5 is a block diagram of a circuit in accordance with a first embodiment of the present invention.

FIG. 5 is a block diagram of an interpolation circuit according to an embodiment of the present invention. Interpolation circuit 500 includes minimum percent difference calculators 501 and 502 and inverse weighted average calculator 503.

Minimum percent difference calculator 501 accepts same-field pixel information from pixels $P_{S1}$–$P_{SN}$, where N is an even number greater than 0. For a three pixel difference system with a group size of one as described with respect to FIG. 3, N is 6. Minimum percent difference calculator 401 computes the average luminance percent cross-difference between pixels as described above and provides a single same-field percent difference and a same-field average red, green, and blue component to inverse weighted average calculator 503. A pseudocode implementation of minimum percent difference calculator 501 is provided in Table 2.

TABLE 2

```
//Calculation relative to the pixel at location (X1,Y1,Z1).
//pixkernelnum is the size of the pixel kernel used in
//the calculation (e.g., three in the above example).
//Grouppixnum is the group size used in the calculation
//pixel determination. Y( ) is the luminance value of
//pixel argument, R( ) is the red component, G( ) is the
//green component, and B( ) is the blue component of the
//pixel argument.
SF_Difference = 1;
SF_Average(R,G,B) = [0,0,0];
N = int(pixkernelnum/2);
M = int(grouppixnum/2);
for i −N to N {
    diff = 0;
    avg = 0
    for j = −M to M {
        diff = diff + abs(Y(Ps(X1+i−j,Y1−1,Z1))
                          −Y(Ps(X1−i+j,Y1+1,Z1)));
        avg = avg + (Y(Ps(X1+i−j,Y1−1,Z1))
                     +Y(Ps(X1−i−j,Y1+1,Z1)))/2;
    }
    pdiff = diff/avg;
    if (pdiff < SF_Difference {
        SF_Difference = abs(Y(Ps(X1+i,Y1−1,Z1))
                            −Y(Ps(X1−i,Y1+1,Z1)));
        SF_Average(R,G,B) = [.5*R(Ps(X1+i,Y1−1,Z1)) +
                             R(Ps(X1−i,Y1+1,Z1)),
                             .5*G(Ps(X1+i,Y1−1,Z1)) +
                             G(Ps(X1−i,Y1+1,Z1)),
                             .5*B(Ps(X1+i,Y1−1,Z1)) +
                             B(Ps(X1−i,Y1+1,Z1))];
    }
}
```

Minimum percent difference calculator 502 accepts adjoining-field pixel information from pixels $P_{A1}$–$P_{AN}$. Minimum percent difference calculator 501 computes the average luminance percent cross-difference between pixels as described above and provides a single adjoining-field percent difference and an adjoining-field average red, green, and blue component to inverse weighted average calculator 503. A pseudocode implementation of minimum percent difference calculator 502 is provided in Table 3.

TABLE 3

```
AF_Difference = 1;
AF_Average(R,G,B) = [0,0,0];
N = int(pixkernelnum/2);
M = int(grouppixnum/2);
for i -N to N {
    diff = 0;
    avg = 0
    for j = -M to M {
        diff = abs(Y(P_A(X_1+i+j,Y_1,Z_1+1))
                     -Y(P_A(X_1-i+j,Y_1,Z_1 -1)));
        avg = (Y(P_A(X_1+i+j,Y_1,Z_1+1))
                     +Y(P_A(X_1-i+j,Y_1,Z_1-1)))/2;
    }
    pdiff = diff/avg;
    if (pdiff < AF_Difference {
        AF_Difference = abs(Y(P_A(X_1+i+j,Y_1,Z_1+1))
                     -Y(P_A(X_1-i+j,Y_1,Z_1-1)));
        AF_Average(R,G,B) = [.5*R(P_A(X_1+i,Y_1,Z_1+1)) +
                     R(P_A(X_1-i,Y_1,Z_1-1)),
                     .5*G(P_A(X_1+i,Y_1,Z_1+1)) +
                     G(P_A(X_1-i,Y_1,Z_1-1)),
                     .5*B(P_A(X_1+i,Y_1,Z_1+1)) +
                     B(P_A(X_1-i,Y_1,Z_1-1))];
    }
}
```

Inverse weighted average calculator 503 accepts same-field percent difference, same-field average red, green, and blue component values, adjoining-field percent difference, and adjoining-field average red, green, and blue component values. Inverse weighted average calculator 503 performs the inverse weighting calculation to provide an interpolated red, green, and blue component values for the pixel being interpolated. A pseudocode implementation of inverse weighted average calculator is provided in Table 4.

TABLE 4

```
SF_weight = SF_Difference/
            (SF_Difference + AF_Difference);
AF_weight = AF_Difference/
            (SF_Difference + AF_Difference);
Interpolated_Pixel = SF_weight*AF_Average(R,G,B) +
            AF_weight*SF_Average (R,G,B)
```

Figure 6:
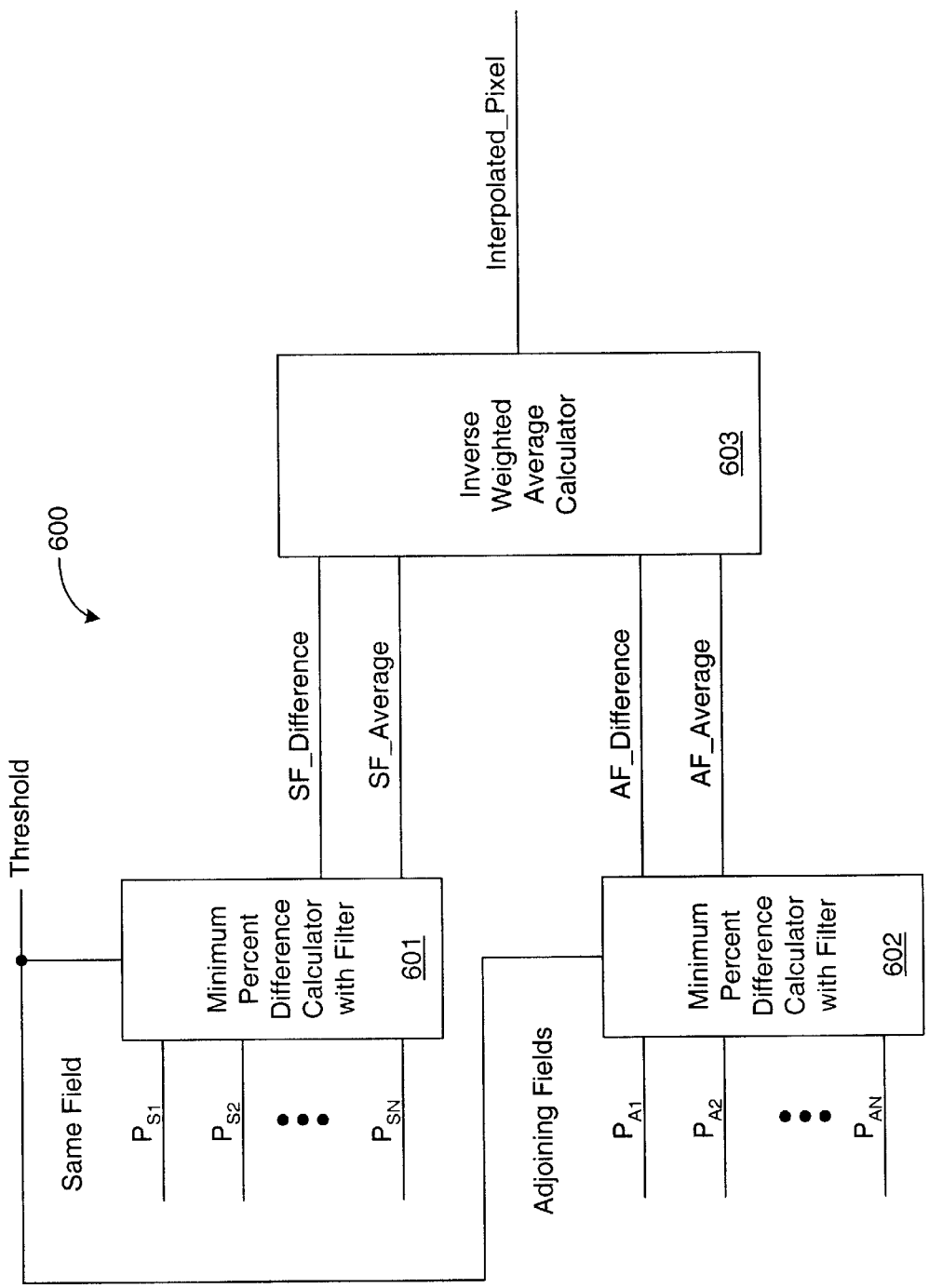
FIG. 6 is a block diagram of a circuit in accordance with a second embodiment of the present invention.

FIG. 6 is a block diagram of a circuit according to another embodiment of the present invention. Interpolation circuit 600 includes minimum percent difference with filter calculators 601 and 602 and inverse weighted average calculator 603. Similar elements in FIGS. 5 and 6 are labeled similarly.

Minimum percent difference with filter calculator 601 accepts same-field pixel information from pixels $P_{SI}$–$P_{SN}$. Minimum percent difference with filter calculator 601 computes the average luminance percent cross-difference between pixels as described above and provides a single same-field percent difference and a same-field average red, green, and blue component to inverse weighted average calculator 603. A pseudocode implementation of minimum percent difference calculator is provided in Table 5.

TABLE 5

```
//Calculation relative to the pixel at location (X_1,Y_1,Z_1)
//pixkernelnum is the size of the pixel kernel used in the
//calculation (e.g., three in the above example). pixel
//determination. Y( ) is the luminance value of pixel
// argument, R( ) is the red component, G( ) is the
//green component, and B( ) is the blue component of the
//pixel argument. The user_defined_threshold is
//determined by the user. The function rnd(x,y) generates
```

TABLE 5-continued

```
//a random number between x and y.
SF_Difference = 1;
SF_Average(R,G,B) = [0,0,0];
N = int(pixkernelnum/2);
center = 0;
tcounter = 0;
minpdiff = 1;
mincol = -N;
thresh = user_defined_threshold;
for i = -N to N {
    diff(i) = diff(i) +abs(Y(P_s(X_1+i,Y_1-1,Z_1))-
                     Y(P_s(X_1-i,Y_1+1,Z_1)));
    avg(i) = abs(i) + (Y(P_s(X_1+i,Y_1-1,Z_1))+
                     Y(P_s(X_1-i,Y_1+1,Z_1)))/2
    pdiff(i) = diff(i)/avg(i)
    if (pdiff(i) < thresh {
        tcounter = tcounter+1;
        underthresh(tcounter) = i
        if (i = 0) then center = 1;
        else if(pdiff(i) < minpdiff) then mincol = i;
    }
}
if (center = 1) then i = 0;
elseif (tcounter > 0) then
i = underthresh(rnd(1,tcounter));
else i = mincol;
endif
SF_Difference = pdiff(i);
SF_Average(R,G,B) = [.5*R(P_s(X_1+i,Y_1-1,Z_1))+
                     R(P_s(X_1-i,Y_1+1,Z_1)),
                     .5*G(P_s(X_1+i,Y_1-1,Z_1)) +
                     G(P_s(X_1-i,Y_1+1,Z_1)),
                     .5*B(P_s(X_1+i,Y_1-1,Z_1)) +
                     B(P_s(X_1-i,Y_1+1,Z_1))];
```

Minimum percent difference with filter calculator 602 accepts adjoining-field pixel information from pixels $P_{AI}$–$P_{AN}$. Minimum percent difference with filter calculator 601 computes the average luminance percent cross-difference between pixels as described above and provides a single adjoining-field percent difference and an adjoining-field average red, green, and blue component to inverse weighted average calculator 603. A pseudocode implementation of minimum percent difference calculator 602 is provided in Table 6.

TABLE 6

```
AF_Difference = 1;
AF_Average(R,G,B) = [0,0,0];
N = int(pixkernelnum/2);
center = 0;
tcounter = 0;
minpdiff = 1;
mincol = -N;
thresh = user_defined_threshold;
    for i -N to N {
        diff(i) = abs(Y(P_A(X_1+i,Y_1,Z_1+1))-
                     Y(P_A(X_1-i,Y_1,Z_1-1)));
        avg(i) = (Y(P_A(X_1+i,Y_1,Z_1+1))+
                     Y(P_A(X_1-i,Y_1,Z_1-1)))/2;
        pdiff(i) = diff(i)/avg(i);
        if (pdiff(i) < thresh {
            tcounter = tcounter+1;
            underthresh(tcounter) = i;
            if (i = 0) then center = 1;
            else if(pdiff(i) < minpdiff) then mincol = i;
        }
    }
if (center = 1) then i = 0;
elseif (tcounter > 0) then
    i = underthresh(rnd(1,tcounter));
else i = mincol;
endif
AF_Difference = pdiff(i);
```

TABLE 6-continued

AF_Average(R,G,B) = [.5*R($P_A(X_1+i,Y_1,Z_1+1)$)+
R($P_A(X_1-i,Y_1,Z_1-1)$)),
.5*G($P_A(X_1+i,Y_1,Z_1+1)$) +
G($P_A(X_1-i,Y_1,Z_1-1)$)),
.5*B($P_A(X_1+i,Y_1,Z_1+1)$) +
B($P_A(X_1-i,Y_1,Z_1-1)$))];

Inverse weighted average calculator 603 accepts same-field percent difference, same-field average red, green, and blue component values, adjoining-field percent difference, and adjoining-field average red, green, and blue component values information. Inverse weighted average calculator 603 performs the inverse weighting calculation to provide an interpolated red, green, and blue component values for the pixel being interpolated. The coded function for inverse weighted average calculator 603 is found above.

The various embodiments of the methods of this invention that are described above are illustrative only of the principles of this invention and are not intended to limit the scope of the invention to the particular embodiments described. For example, although the described embodiment uses a three pixel kernel (three pixels each above, below, back in time, and forward in time) and a group size of one or three, this method may be used with any number of pixel kernels and group sizes to achieve similarly beneficial results. Thus, another embodiment may use five pixels each above, below, back in time, and forward in time of the pixel to be interpolated and a group size of seven according to the principles of this invention. Thus, the invention is limited only by the following claims.

What is claimed is:

1. A method for interpolating pixel values in a de-interlacing video scheme, said method comprising:
    determining a same-field pixel pair,
    determining an adjoining-field pixel pair; and
    assigning the average of the same-field and adjoining-field pixel pairs to a pixel to be interpolated,
    wherein said method is repeated for each pixel to be interpolated; and
    wherein determining the same-field pixel pair comprises:
        determining a cross-difference of a first same-field pixel pair;
        determining a average of the first same-field pixel pair; and
        calculating the percent cross-difference of the first same-field pixel pair from the cross-difference and the average of the first same-field pixel pair.

2. The method of claim 1, wherein determining the same-field pixel pair further comprises:
    determining the cross-difference of a second same-field pixel pair;
    determining the average of the second same-field pixel pair;
    calculating the percent cross-difference of the second same-field pixel pair from the cross-difference and the average of the second same-field pixel pair.

3. The method of claim 2, wherein determining the same-field pixel pair further comprises determining the minimum of the percent cross-differences of the first and second same-field pixel pairs.

4. The method of claim 2, wherein determining the same-field pixel pair further comprises:
    assigning a threshold percentage;
    comparing the first and second percentage cross-differences to the threshold;
    preferring a same-field pixel pair under the threshold located in a same column as the pixel to be interpolated to a same-field pixel pair under the threshold located in a different column from the pixel to be interpolated.

5. The method of claim 2, wherein determining the same-field pixel pair further comprises:
    assigning a threshold percentage;
    comparing the first and second percentage cross-differences to the threshold;
    randomly choosing between a same-field pixel pair under the threshold located in a different column from the pixel to be interpolated and another same-field pixel pair under the threshold located in different column from the pixel to be interpolated.

6. A method for interpolating pixel values in a de-interlacing video scheme, said method comprising:
    determining a same-field pixel pair;
    determining an adjoining-field pixel pair;
    assigning the average of the same-field and adjoining-field pixel pairs to a pixel to be interpolated,
    wherein said method is repeated for each pixel to be interpolated; and
    wherein determining the adjoining-field pixel pair comprises:
        determining the cross-difference of a first adjoining-field pixel pair;
        determining the average of the first adjoining-field pixel pair; and
        calculating the percent cross-difference of the first adjoining-field pixel pair from the cross-difference and the average of the first adjoining-field pixel pair.

7. The method of claim 6, wherein determining the adjoining-field pixel pair further comprises:
    determining the cross-difference of a second adjoining-field pixel pair;
    determining the average of the second adjoining-field pixel pair;
    calculating the percent cross-difference of the second adjoining-field pixel pair from the cross-difference and the average of the second adjoining-field pixel pair.

8. The method of claim 7, wherein determining the adjoining-field pixel pair further comprises determining the minimum of the percent cross-differences of the first and second adjoining-field pixel pairs.

9. The method of claim 7, wherein determining the adjoining-field pixel pair further comprises:
    assigning a threshold percentage;
    comparing the first and second percentage cross-differences to the threshold;
    preferring an adjoining-field pixel pair under the threshold located in a same column as the pixel to be interpolated to an adjoining-field pixel pair under the threshold located in a different column from the pixel to be interpolated.

10. The method of claim 7, wherein the step of determining the adjoining-field pixel pair further comprises the steps of:
    assigning a threshold percentage;
    comparing the first and second percentage cross-differences to the threshold;
    randomly choosing between an adjoining-field pixel pair under the threshold located in a different column from the pixel to be interpolated and another adjoining-field pixel pair under the threshold located in different column from the pixel to be interpolated.

11. The method of claim 1, wherein the step of determining the adjoining-field pixel pair comprises the steps of:
  determining a cross-difference of a first adjoining-field pixel pair;
  determining a average of the first adjoining-field pixel pair; and
  calculating the percent cross-difference of the first adjoining-field pixel pair from the cross-difference and the average of the adjoining-field pixel pair.

12. The method of claim 11, wherein the step of assigning an average of the same-field and adjoining-field pixel pairs to a pixel to be interpolated comprises the steps of:
  calculating a first intermediate value by weighting the average of the first same-field pixel pair with the percent cross-difference of the first adjoining-field pixel pair, thereby inversely weighting the first adjoining-field pixel pair;
  calculating a second intermediate value by weighting the average of the first adjoining-field pixel pair with the percent cross-difference of the first same-field pixel pair, thereby inversely weighting the first same-field pixel pair; and
  calculating a weighted average by dividing the sum of the first and second intermediate values by the sum of the percent cross-difference of the first same-field pixel pair and the percent cross-difference of the first adjoining-field pixel pair.

13. A method for interpolating pixel values in a de-interlacing video scheme, said method comprising:
  determining a same-field pixel pair;
  determining an adjoining-field pixel pair; and
  assigning the average of the same-field and adjoining-field pixel pairs to a pixel to be interpolated,
  wherein said method is repeated for each pixel to be interpolated; and
  wherein determining the same-field pixel pair comprises:
    summing cross-differences of a first group of one or more same-field pixel pairs to form a first same-field group sum;
    summing cross-differences of a second group of one or more same-field pixel pairs to form a second same-field group sum;
    determining a first minimum sum from a minimum of the first same-field group sum and the second same-field group sum;
    determining an average of a center same-field pixel pair of the first minimum sum; and
    calculating a percent cross-difference of the center same-field pixel pair from the cross-difference and the average of the center same-field pixel pair.

14. The method of claim 13, wherein determining the same-field pixel pair further comprises:
  assigning a threshold percentage;
  comparing a first percentage cross-difference and a second percentage cross-difference to the threshold;
  preferring a same-field pixel pair under the threshold located in a same column as the pixel to be interpolated to a same-field pixel pair under the threshold located in a different column from the pixel to be interpolated.

15. The method of claim 13, wherein determining the same-field pixel pair further comprises:
  assigning a threshold percentage;
  comparing a first percentage cross-difference and a second percentage cross-difference to the threshold;
  randomly choosing between a same-field pixel pair under the threshold located in a different column from the pixel to be interpolated and another same-field pixel pair under the threshold located in different column from the pixel to be interpolated.

16. The method of claim 13, wherein the step of determining the adjoining-field pixel pair comprises the steps of:
  summing cross-differences of a first group of one or more adjoining-field pixel pairs to form a first adjoining-field group sum;
  summing cross-differences of a second group of one or more adjoining-field pixel pairs to form a first adjoining-field group sum;
  determining a second minimum sum from a minimum of the first group adjoining-field sum and the second group adjoining-field sum;
  determining an average of a center adjoining-field pixel pair of the second minimum sum; and
  calculating a percent cross-difference of the center adjoining-field pixel pair from the cross-difference and the average of the center adjoining-field pixel pair.

17. The method of claim 16, wherein the step of assigning an average of the same-field and adjoining-field pixel pairs to a pixel to be interpolated comprises the steps of:
  calculating a first intermediate value by weighting the average of the first same-field pixel pair with the percent cross-difference of the first adjoining-field pixel pair, thereby inversely weighting the first adjoining-field pixel pair;
  calculating a second intermediate value by weighting the average of the first adjoining-field pixel pair with the percent cross-difference of the first same-field pixel pair, thereby inversely weighting the first same-field pixel pair; and
  calculating a weighted average by dividing the sum of the first and second intermediate values by the sum of the percent cross-difference of the first same-field pixel pair and the percent cross-difference of the first adjoining-field pixel pair.

18. A method for interpolating pixel values in a de-interlacing video scheme, said method comprising:
  determining a same-field pixel pair;
  determining an adjoining-field pixel pair; and
  assigning the average of the same-field and adjoining-field pixel pairs to a pixel to be interpolated,
  wherein said method is repeated for each pixel to be interpolated; and
  wherein determining the adjoining-field pixel pair comprises:
    summing cross-differences of a first group of one or more adjoining-field pixel pairs to form a first group of adjoining-field group sum;
    summing cross-differences of a second group of one or more adjoining-field pixel pairs to form a first group of adjoining-field group sum;
    determining a minimum sum from a minimum of the first group adjoining-field sum and the second group adjoining-field sum;
    determining an average of a center adjoining-field pixel pair of the minimum sum; and
    calculating a percent cross-difference of the center adjoining-field pixel pair from the cross-difference and the average of the center adjoining-field pixel pair.

19. The method of claim 18, wherein determining the adjoining-field pixel pair further comprises:

assigning a threshold percentage;

comparing a first percentage cross-difference and a second percentage cross-difference to the threshold;

preferring an adjoining-field pixel pair under the threshold located in a same column as the pixel to be interpolated to an adjoining-field pixel pair under the threshold located in a different column from the pixel to be interpolated.

20. The method of claim 18, wherein the step of determining the adjoining-field pixel pair further comprises the steps of:

assigning a threshold percentage;

comparing a first percentage cross-difference and a second percentage cross-difference to the threshold;

randomly choosing between an adjoining-field pixel pair under the threshold located in a different column from the pixel to be interpolated and another adjoining-field pixel pair under the threshold located in different column from the pixel to be interpolated.

21. A method for interpolating pixel values in a de-interlacing video scheme, said method comprising the steps of:

determining a same-field pixel pair, said same-field pixel pair having a percent cross-difference and an average pixel value;

determining an adjoining-field pixel pair, said adjoining-field pixel pair having a percent cross-difference and an average pixel value; and assigning the inverse weighted average of the same-field and adjoining-field pixel pairs to a pixel to be interpolated.

22. The method of claim 21, wherein said method is repeated for each pixel to be interpolated.

23. A de-interlacing circuit for de-interlacing a digitized video signal, said circuit comprising:

a same-field minimum percent difference calculator configured to receive a plurality of pixel values and configured to generate a minimum same-field percent difference and a same-field average value;

an adjoining-field minimum percent difference calculator configured to receive a plurality of pixel values and configured to generate a minimum adjoining-field percent difference and an adjoining-field average value; and an inverse weighted average calculator coupled to said same-field and adjoining-field minimum percent difference calculators and configured to calculate an interpolated pixel value from an inverse weighted average of the same-field and adjoining-field percent differences and the same-field and adjoining-field average values.

24. The method of claim 23, wherein the same-field and adjoining-field minimum percent difference calculators accept a threshold value.

25. A de-interlacing circuit for de-interlacing a digitized video signal, said circuit comprising:

a same-field filtering percent difference calculator configured to receive a plurality of pixel values and configured to generate a same-field average value and one of a minimum same-field percent difference and a preferred same-field percent difference, wherein said preferred same-field percent difference is below a threshold;

an adjoining-field filtering percent difference calculator configured to receive a plurality of pixel values and configured to generate an adjoining-field average value and one of a minimum adjoining-field percent difference and a preferred adjoining-field percent difference, wherein said preferred adjoining-field percent difference is below the threshold; and an inverse weighted average calculator coupled to said same-field and adjoining-field filtering percent difference calculators and configured to calculate an interpolated pixel value from an inverse weighted average of the same-field and adjoining-field percent differences and the same-field and adjoining-field average values.

26. The circuit of claim 25, wherein center pixels are used to calculate the preferred adjoining-field percent difference.

* * * * *